United States Patent [19]

Matsuda

[11] Patent Number: 5,604,034
[45] Date of Patent: Feb. 18, 1997

[54] VINYL MARKING FILM HAVING PLASTICIZER RESISTANT PRESSURE SENSITIVE ADHESIVE

[75] Inventor: Hiroshi Matsuda, Yamagata, Japan

[73] Assignee: Minnesota Mining and Manufacturing Company, St. Paul, Minn.

[21] Appl. No.: 39,338

[22] PCT Filed: Apr. 27, 1993

[86] PCT No.: PCT/US93/03882

§ 371 Date: Sep. 19, 1994

§ 102(e) Date: Sep. 19, 1994

[87] PCT Pub. No.: WO93/22391

PCT Pub. Date: Nov. 11, 1993

[30] Foreign Application Priority Data

Apr. 28, 1992 [JP] Japan ................... 4-109375

[51] Int. Cl.$^6$ ................................................. C09J 7/02
[52] U.S. Cl. ................................... 428/355; 525/318
[58] Field of Search ............................... 428/343, 355; 528/318.2, 318.4, 318.44

[56] References Cited

U.S. PATENT DOCUMENTS

| | | | |
|---|---|---|---|
| 4,605,592 | 8/1986 | Paquette | 428/355 |
| 4,983,656 | 1/1991 | Ito et al. | 524/109 |

FOREIGN PATENT DOCUMENTS

| | | | |
|---|---|---|---|
| 0338724A2 | 10/1989 | European Pat. Off. | C09J 3/14 |
| 2407494 | 8/1975 | Germany | C09J 3/14 |
| 59-5944 | 1/1984 | Japan | G01N 27/58 |
| 3-45671 | 2/1991 | Japan | C09J 7/02 |

*Primary Examiner*—Jenna Davis
*Attorney, Agent, or Firm*—Gary L. Griswold; Walter N. Kim; Carolyn V. Peters

[57] ABSTRACT

A decorative film that is free of deterioration of the surface film due to the generation of wrinkles even when being applied to an adherent having plasticizer migration ability, such as polyvinyl chloride, and an adhesive therefor comprising: 100 parts by weight of a copolymer having a weight average molecular weight of 700,000–1,200,000 obtained by copolymerization of 64–75% by weight of a (meth)acrylate having a $C_4$–$C_8$-alkyl group, 20–26% by weight of methyl methacrylate and 5–10% by weight of acrylic acid, and 0.005 to 0.1 parts by weight of a crosslinker.

3 Claims, No Drawings

VINYL MARKING FILM HAVING PLASTICIZER RESISTANT PRESSURE SENSITIVE ADHESIVE

TECHNICAL FIELD

The present invention relates to a plasticizer resistant, decorative film and an adhesive therefor.

BACKGROUND OF THE INVENTION

A decorative film is comprised of a surface film, such as vinyl chloride, on which an adhesive layer is applied or laminated and, in some cases, said adhesive layer is protected by a release film. In the case of possessing a release film, this decorative film is used by applying it on the surface of an adherent (article to be decorated) after removing the release film.

In this case, since the adherend is comprised of a resin having a strong plasticizer migration ability, such as a vinyl chloride resin, when the surface film is a film having a low plasticizer resistance, such as a vinyl chloride sheet, the plasticizer is migrated from the adherent to the surface film, generating wrinkles on the surface sheet and, thereby resulting in the impairment of its decorative characteristics and weathering characteristics. For this reason, a means is required to prevent the deterioration of the surface film due to the migration of the plasticizer from the adherent.

Japanese Unexamined Patent Publication (Kokai) No. 59-5944 discloses a decorative film which prevents the migration of a plasticizer from an adherent to the film by placing a barrier layer comprising a urethane resin between a vinyl chloride surface film and an adhesive layer. In such an aspect, however, the production cost become unduly expensive because of the addition of the barrier layer. Japanese Unexamined Patent Publication (Kokai) No. 3-45671 discloses a decorative film which utilizes a surface film having improved plasticizer resistance due to the content of a urethane resin, and an adhesive containing a plasticizer resistant monomer, such as vinyl acetate. However, the cost of this decorative film tends to be expensive due to the use of the surface film containing a urethane resin.

SUMMARY OF THE INVENTION

The present invention provides an adhesive film having high plasticizer resistance and capable of preventing the deterioration of a film without placing any barrier layer against a plasticizer, and to provide a decorative film using said adhesive comprising 100 parts by weight of a copolymer having a weight average molecular weight of 700,000–1,200,000 obtained by copolymerization of 64–75% by weight of a (meth)acrylate having a $C_4$–$C_8$-alkyl group, 20–26% by weight of methyl methacrylate and 5–10% by weight of acrylic acid, and 0.005 to 0.1 parts by weight of a crosslinker.

DESCRIPTION OF THE PREFERRED EMBODIMENT

The "(meth)acrylate having a $C_4$–$C_8$-alkyl group" which is used in the present invention means an alkyl acrylate or alkyl methacrylate having 4–8 carbon atoms in the alkyl group, the alkyl moiety of which is butyl, pentyl, hexyl, heptyl, or octyl, it being possible for these alkyl groups to be a linear or branched chain. Typical examples of such alkyl acrylates and alkyl methacrylates include 2-ethylhexyl acrylate, n-butyl acrylate, and butyl methacrylate.

The reasons why the amount of the (meth)acrylate having a $C_4$–$C_8$-alkyl group should be defined to be 64 to 75% by weight based on 100% by weight the total monomer amount are as follows: if the amount is more than the upper limit, the performance of plasticizer resistance deteriorates, and if it is less than the lower limit, the glass transition point increases and, thus, the adhesion at a low temperature decreases. More preferably, the amount of (meth)acrylate having a $C_4$–$C_8$-alkyl group is 70 to 72 parts by weight.

The amount of methyl methacrylate is to be defined in the range of 20–26% by weight based on 100% by weight the total monomer amounts, because the adhesion decreases if it is less than 20% by weight, and conversely the adhesion characteristics at a low temperature decrease if it is more than 26% by weight. The amount of acrylic acid is to be defined in the range of 5–10% by weight based on 100% by weight the total monomer amount, because the adhesion drastically decreases if it is less than 5% by weight, and conversely, the adhesion characteristics at a low temperature decrease if it is more than 10% by weight.

In the copolymerization of the above-described monomer components, a catalyst is preferably used in order to accelerate the polymerization. As such a catalyst, peroxybenzoyl, azobisisobutyronitrile, or the like is used, typical examples of which include Benper W75 (produced by Daiichi Kasei Kogyo Co., Ltd.), Lucido L-70 (produced by Pennwal), and the like. The amount of the catalyst used varies depending on the type of the catalyst, but usually is 0.01 to 5 parts by weight, preferably 0.01 to 0.5 part by weight, based on 100 parts by weight of the total monomer amount.

For the purpose of improving the coherent strength, the molecular weight of the polymer is preferably in the range of 700,000 to 1,200,000 because if it is less than 700,000, it is difficult to effectively prevent the generation of wrinkles on the surface film due to the migration of the plasticizer, and if it exceeds 1,200,000, the viscosity increases so much that a solution polymerization can be carried out only with difficulty, which leads to a disadvantage from the viewpoint of production. The weight average molecular weight herein is measured by the gel permeation chromatographic method.

The adhesive of the present invention further contains a bisamide crosslinker or a isocyanate crosslinker in order to improve the coherent strength. Examples of bisamide type crosslinkers include 1,4-bis(ethyleneiminocarbonylamino)benzene, 4,4'-bis(ethyleneiminocarbonylamino)diphenylmethane, 1,8-bis(ethyleneiminocarbonylamino)octane, and the like, and typically RD1054 (produced from 3M Company, U.S.A.) can be used. As the isocyanate type crosslinker, 1,4-tolylene diisocyanate and hexamethylene diisocyanate can be mentioned, and typically Coronate L (produced by Nippon Polyurethane) and Coronate L-55E (produced by Nippon Polyurethane) may be used.

As the crosslinker of the present invention, the bisamide type is preferable because it has a higher reactivity with the copolymer and, thus, its effect can be exhibited by using a smaller amount, and because it is minimally influenced by moisture in air, etc., in the air, and only a small variability of crosslinking efficiency can be attained.

The amount of the crosslinker to be added is defined to be in the range of 0.005 to 0.1 part by weight based on 100 part by weight the copolymer. If the amount is less than 0.05 part by weight, the coherent strength does not sufficiently increase, and the migration of the plasticizer and the generation of wrinkles on the surface film resulting therefrom cannot sufficiently be prevented. Conversely, if it is more than 0.1 part by weight, the adhesion retention after the migration of the plasticizer significantly decreases.

In the production of the adhesive of the present invention, the above-mentioned monomers are dissolved in an appropriate solvent, e.g., acetic acid, acetone, hexane, benzene, or a mixture thereof, and the polymerization is initiated by the addition of the above-described catalyst. The polymerization temperature is 40°–100° C., and preferably 50°–80° C., and the polymerization time is 6–24 hours, and preferably 12–20 hours.

After the polymerization has ended, the crosslinker is added to the formed polymer, after which it is applied on the surface film to produce a decorative film of the present invention. As the surface film, any desired decorative film, such as a polyvinyl chloride film, a polyurethane film, or a polyester film, may be used. Particularly, when a film having a relatively low plasticizer resistance, such as a polyvinyl chloride film, is used, the effect of the present invention is attained.

For coating the adhesive of the present invention on a film, a usual means for applying an adhesive can be used. For example, a knife coater, roll coater, curtain flow coater, or the like can be used. The film thickness is 20–200 μm, and preferably 30–100 μm, and the thickness of the adhesive layer is 10–50 μm, and preferably 30–40 μm. On the surface of the adhesive layer of the decorative film according to the invention, a release sheet for protecting the adhesive layer, such as a silicone type release paper or a fluorine release paper, may be applied.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

Examples

Production of Film

The production was carried out as follows: prescribed monomeric components and a peroxybenzoyl polymerization catalyst (both varying in their amounts) were dissolved in such an amount of ethyl acetate as to be substantially equal to the total amount of the monomers and catalyst, and the polymerization was carried out at the boiling point of the reaction mixture for 18 hours. After the polymerization, more ethyl acetate was added to the formed polymer to adjust the viscosity of the polymer to an appropriate coating viscosity (2500–3500 cps/25° C.). To this was added a bisamide crosslinker (RD 1054, 3M Company, U.S.A.), etc., and the mixture was thoroughly agitated. The polymer was applied on a separator by a knife coater to a thickness of 35 μm after drying, dried in an oven at 90° C. for 2 minutes, after which the formed layer was transferred to a 50 μm thick soft polyvinyl chloride film having been primer-coated, to produce an adhesive film.

Evaluation (1) Initial Adhesion

The film produced as described above was cut into 1 inch wide pieces, and each piece was adhered on a polyvinyl chloride adherent containing 55 PHR of dioctylphthalate (55 parts by weight based on 100 parts by weight of the resin) at 20° C. at a 65% relative humidity to produce a test piece. This adherent was fixed on an aluminum plate by means of a double sided adhesive tape. The test piece was left standing at 20° C. at a 65% relative humidity for 48 hours, and then peel strength was measured at a peeling angle of 180° at a peeling rate of 300.0 mm/min. The scoring criteria was as follows:

o . . . 3.0 kg/inch or more of the initial adhesion

Δ . . . 1.0 kg/inch or more of the initial adhesion x . . . less than 1.0 kg/inch of the initial adhesion (2) Heat Aged Adhesion The test piece produced as described in the paragraph of the initial adhesion was aged at 65° C. for 1 week, and the peel strength was measured at 20° C. at a 65% RH at a peeling angle of 180° at a peeling rate of d 300.0 kg/min by using a tensile tester. The rating criteria was the same as those of the initial adhesion.

(3) Appearance Changes (Test for Generation of Wrinkles

Each sample was applied on a separator to a thickness of 35 μm after drying, dried in an oven at 90° C. for 5 minutes, and then laminated on a 50 μm thick soft vinyl chloride film to produce an adhesive film. The adhesive film was cut into 12×13 cm pieces, and adhered on a vinyl adherend containing 55 PHR of DOP measuring 15×15 cm in size by means of rollers. This was left standing at 65° C. for 72 hours, and the generation of wrinkles after the temperature had been cooled to room temperature was visibly observed. The rating criteria was as follows:

o . . . not changed

Δ . . . slight generation of wrinkles x . . . significant generation of wrinkles.

Table 1 shows the compositions used in Examples (1–8) and Comparative Examples (C1–C7). Table II summarizes the evaluation of the examples.

Table I Glossary

AA . . . acrylic acid

MMA . . . methyl methacrylate

2EHA . . . 2-ethylhexyl acrylate

RD 1054 a bisamide crosslinker

L-55E . . . an isocyanate crosslinker

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

| Examples | AA | MMA | BA | 2EHA | RD10054 | L55E |
|---|---|---|---|---|---|---|
| 1 | 7 | 22 | 47 | 24 | 0.005 | — |
| 2 | 7 | 22 | 47 | 24 | 0.01 | — |
| 3 | 7 | 22 | 47 | 24 | 0.05 | — |
| 4 | 8 | 20 | 50 | 22 | 0.07 | — |
| 5 | 10 | 26 | 40 | 24 | 0.07 | — |
| 6 | 5 | 20 | 50 | 25 | — | 0.01 |
| 7 | 10 | 20 | 35 | 35 | — | 0.05 |
| 8 | 6 | 25 | 48 | 21 | — | 0.1 |
| C1 | 3 | 40 | 30 | 27 | 0.003 | — |
| C2 | 15 | 30 | 40 | 15 | 0.25 | — |
| C3 | 15 | 15 | 60 | 10 | 0.01 | — |
| C4 | 30 | 10 | 40 | 40 | 0.08 | — |
| C5 | 10 | 25 | 45 | 20 | — | 0.001 |
| C6 | 0 | 18 | 65 | 17 | — | 0.2 |
| C7 | 6 | 25 | 46 | 21 | — | — |

-continued

| Examples | Mw (10³) | Composition Evaluation | | |
|---|---|---|---|---|
| | | Initial Adhesion | Adhesion After Aging | Appearance Changes |
| 1 | 797 | o | o | o |
| 2 | 797 | o | o | o |
| 3 | 797 | o | o | o |
| 4 | 1150 | o | o | o |
| 5 | 851 | o | o | o |
| 6 | 1030 | o | o | o |
| 7 | 995 | o | o | o |
| 8 | 813 | o | o | o |
| C1 | 502 | x | x | x |
| C2 | 822 | x | x | o |
| C3 | 980 | o | Δ | x |
| C4 | 886 | o | Δ | x |
| C5 | 1010 | o | x | x |
| C6 | 532 | x | x | x |
| C7 | 813 | o | x | x |

I claim:

1. An adhesive for decorative film consisting of: 100 parts by weight of a copolymer having a weight average molecular weight of 700,000–1,200,000 obtained by copolymerization of 64–75% by weight of a (meth)acrylate having a $C_4$–$C_8$ alkyl group, 20–26% by weight of methyl methacrylate and 5–10% by weight of acrylic acid, and 0.005 to 0.1 parts by weight based on 100 parts by weight of the copolymer of a bisamide crosslinker.

2. A decorative film characterized by having the adhesive of claim 1 applied or laminated on a surface film.

3. A decorative film as set forth in claim 2, wherein said surface film is a polyvinyl chloride.

* * * * *